3,697,394
SYNTHESIS OF OXYCHLORINE TRIFLUORIDE
Donald Pilipovich and Richard D. Wilson, Canoga Park, Calif., assignors to North American Rockwell Corporation
No Drawing. Filed Apr. 3, 1968, Ser. No. 720,434
Int. Cl. C01b 11/02, 11/24
U.S. Cl. 204—157.1 R    5 Claims

ABSTRACT OF THE DISCLOSURE

A synthesis of $ClF_3O$ comprising reacting under ultraviolet radiation oxygen and either chlorine and fluorine or a compound consisting of chlorine and fluorine.

REFERENCES TO RELATED APPLICATIONS

This application is related to copending U.S. application Ser. No. 543,493, in which a new composition of matter, oxychlorine trifluoride, $OClF_3$, is revealed.

BACKGROUND OF THE INVENTION

The invention herein described was made in the course of or under a contract with the Department of the Navy.

The compound $OClF_3$ has utility as an oxidizer both in liquid rocket applications and in chemical syntheses. It is prepared, as revealed in the referenced copending application, by complexing $Cl_2O$ with an alkali metal at a low temperature and fluorinating the complex. Another preparation given therein is the reacting of $Cl_2O$ with fluorine. These methods have the disadvantage of using complex starting materials which are also hazardous and having lower yields than are desirable to produce quantities of oxychlorine trifluoride economically. It would therefore be desirable to provide a process for the preparation of oxychlorine trifluoride on a batch or flow basis that uses relatively inexpensive starting materials and operates at high yields.

It is an object of this invention to provide a process for the preparation of oxychlorine trifluoride.

It is a further object of this invention to provide a process using inexpensive starting materials to produce oxychlorine trifluoride.

Other and further objects of the invention will become apparent from the following detailed description.

DESCRIPTION OF THE INVENTION

The objects of this invention are achieved by reacting under ultraviolet excitation either oxygen, chlorine and fluorine or oxygen and compounds consisting of chlorine and fluorine. The reaction preferably should be excited by light of a wave length shorter than 2400 A. but irradiation down to 3000 A. will suffice.

The preferred synthesis according to this invention uses elemental chlorine, oxygen and fluorine. While the reaction will operate at any ratio of reactants, it has been surprisingly found that it work best when it is run with an excess of stoichiometric amounts of oxygen. The preferred ratio of reactants is one volume part chlorine to three volume part fluorine to ten volume parts oxygen.

As will be obvious to those skilled in the art, the gas phase production of $OClF_3$ from two or more reactant gases is favored by an increase in pressure and by a decrease in temperature. The lower limitation on the temperature, of course, would be the point at which one or more of the reactant gases has a negligible vapor pressure. In the case of the elemental synthesis at atmospheric pressures, the elemental chlorine would be the limiting factor, as it liquifies at the highest temperature. Naturally, at higher pressures this liquefaction of reaction gases would occur at lower temperatures according to familiar principles and properties known to those in the art. The highest temperature has not precisely been ascertained due to the obvious fact that the reaction would not be favored by higher temperatures. It is clear, however, that the reaction does take place at ambient temperatures, although a very poor yield results due to the degradation of products by the activating radiation. Similarly, the lower suitable pressure has not been ascertained due to the apparent fact that increased pressure favors the reaction. However, atmospheric pressure is clearly suitable. The upper pressure range would appear to be limited by the construction of the apparatus as some transparent means must be used to transmit the ultraviolet radiation to the reaction mixture and this transparent means is the aforementioned limiting factor. Generally, a sapphire window is the most effective transparent means and pressures above 1000 p.s.i. are not at this time feasible with a window of adequate area for facile reaction.

It has surprisingly been found that there is a delay in the formation of $OClF_3$ in the elemental system of approximately 29 minutes at $-60°$ C. at atmospheric pressure. This would seem to indicate that some intermediate species is being formed and that this intermediate species must reach a certain concentration before further reaction to produce $OClF_3$ ensues. It would appear further that this delay period is variable, dependent upon the pressure and temperature, as indicated above.

As indicated above, other compounds consisting of chlorine and fluorine can be combined with oxygen according to the processes of the instant invention. Examples of such other compounds are $ClF$, $ClF_3$ and $ClF_5$. Upon mixing with oxygen and irradiation, these compounds also yield $OClF_3$.

Other and more specific advantages of this invention will become apparent from the following examples:

EXAMPLE I

Chlorine, fluorine and oxygen in a molar ratio of 1:3:10 were reacted for one hour at $-60°$ C. under ultraviolet irradiation. $ClF_3O$ was produced in 16 percent yield.

EXAMPLE II

Chlorine, fluorine and oxygen in a molar ratio of 1:3:1 were reacted at atmospheric pressure at $-60°$ C. for one hour under ultraviolet irradiation. $ClF_3O$ was produced.

EXAMPLE III

Chlorine, fluorine and oxygen were reacted at molar ratios of 1:3.3:10 at $-40°$ C. for one hour under ultraviolet irradiation. $ClF_3O$ was produced at 5 percent yield.

EXAMPLE IV

Chlorine, fluorine and oxygen were reacted in molar ratios of 1:3:10 at $-60°$ C. for 6 hours. $ClF_3O$ was produced in 49 percent yield.

EXAMPLE V $ClF_3$ and oxygen were reacted at atmospheric pressure at $-60°$ C. for 6 hours. $ClF_3O$ was produced in 23 percent yield.

EXAMPLE VI $ClF$ and oxygen were reacted at atmospheric pressure at $-40°$ C. for 3 hours. $ClF_3O$ was produced.

EXAMPLE VII $ClF_5$ and oxygen were reacted at atmospheric pressure at $-60°$ C. for 6 hours. $ClF_3O$ was produced.

It is to be understood that the above described embodiments are merely illustrative of application of the principles of this invention. Those skilled in the art may readily devise other variations that will embody the principles of the invention. It is, therefore, to be understood that within the scope of the appended claims the invention may be practiced otherwise than as specifically described.

What is claimed is:
1. The process of producing $ClF_3O$ comprising: reacting under ultraviolet radiation oxygen with fluorine and chlorine or with a compound consisting of fluorine and chlorine, thereby
    producing $ClF_3O$; and
    separating said $ClF_3O$.
2. The process of claim 1 wherein the oxygen is reacted with fluorine and chlorine.
3. The process of claim 1 wherein oxygen is reacted with a compound consisting of chlorine and fluorine.
4. The process of claim 3 wherein the compound consisting of chlorine and fluorine is a compound selected from the group consisting of $ClF$, $ClF_3$ and $ClF_5$.
5. The process of claim 1 wherein the oxygen, chlorine, and fluorine are present in ratios of from 1:1:3 to 20:1:3.

References Cited
UNITED STATES PATENTS
3,320,031  5/1967  Grosse et al. _____ 23—203

OTHER REFERENCES

Burgon, R.: Analysis of the Products of Reaction of Chlorine Trifluoride and Water Vapor, Nuclear Science Abstracts 21–12381, April 1967.

CARL D. QUARFORTH, Primary Examiner

F. M. GITTES, Assistant Examiner

U.S. Cl. X.R.

23—203; 149—1, 109